(12) United States Patent
Burger (10) Patent No.: US 11,479,975 B2
(45) Date of Patent: Oct. 25, 2022

(54) STAIR ASSEMBLY, AN OBJECT AND A STAIR ASSEMBLY OPERATING METHOD

(71) Applicant: Aiber Exploitatie Management B.V., Breukelen (NL)

(72) Inventor: Gerrit Burger, Breukelen (NL)

(73) Assignee: Aiber Exploitatie Management B.V., Breukelen (NL)

( * ) Notice: Subject to any disclaimer, the term of this patent is extended or adjusted under 35 U.S.C. 154(b) by 0 days.

(21) Appl. No.: 17/040,732

(22) PCT Filed: Mar. 25, 2019

(86) PCT No.: PCT/NL2019/050186
§ 371 (c)(1),
(2) Date: Sep. 23, 2020

(87) PCT Pub. No.: WO2019/182452
PCT Pub. Date: Sep. 26, 2019

(65) Prior Publication Data
US 2021/0010271 A1    Jan. 14, 2021

(30) Foreign Application Priority Data

Mar. 23, 2018   (NL) .................................. NL2020661

(51) Int. Cl.
*E04F 11/06*      (2006.01)
*B63B 29/20*      (2006.01)
(Continued)

(52) U.S. Cl.
CPC .............. *E04F 11/06* (2013.01); *B63B 29/20* (2013.01); *B64D 11/00* (2013.01); *E04F 11/1865* (2013.01)

(58) Field of Classification Search
CPC ......... E04F 11/04; E04F 11/06; E04F 11/062; E04F 11/064; E04F 11/066; E04F 11/068;
(Continued)

(56) References Cited

U.S. PATENT DOCUMENTS 4,642,953 A     2/1987  De Good
4,971,168 A *   11/1990 Stanescu ................. B63B 27/14
                                                        182/1

(Continued)

*Primary Examiner* — William V Gilbert
(74) *Attorney, Agent, or Firm* — Schroeder Law PC (57) ABSTRACT

This invention relates to a stair assembly to be arranged in a stairwell opening of an upper floor, comprising: —a girder assembly; —a plurality of steps mounted to the girder assembly; and —a guard structure, wherein the girder assembly is pivotably mountable to the upper floor to pivot about a pivot axis between an operational position, in which the girder assembly extends obliquely downwards, and a hidden position, in which the girder assembly extends horizontally, wherein the moveable guard structure is moveable between an operational position, in which the guard structure extends upwards, and a hidden position, in which the guard structure has moved downwards, and wherein the stair assembly is configured such that when the girder assembly and the guard structure are in their respective hidden positions a person is able to walk over the stair assembly as part of the upper floor.

10 Claims, 5 Drawing Sheets

(51) Int. Cl.
  *B64D 11/00* (2006.01)
  *E04F 11/18* (2006.01)
(58) Field of Classification Search
  CPC ...... E04F 11/18; E04F 11/1865; B63B 29/20; B60R 3/005; E06C 7/181
  USPC .......................................................... 52/19
  See application file for complete search history.

(56) References Cited

U.S. PATENT DOCUMENTS

| | | | | |
|---|---|---|---|---|
| 6,845,845 | B2* | 1/2005 | Schmid, Jr. ........... | E04F 11/002 |
| | | | | 182/141 |
| 8,336,825 | B2* | 12/2012 | Meyer-Rusitschka .... | B64C 1/24 |
| | | | | 244/137.2 |
| 8,756,869 | B1* | 6/2014 | Routt ........................ | E04H 9/14 |
| | | | | 52/20 |
| 8,807,283 | B2* | 8/2014 | Shell .................... | B66B 9/0869 |
| | | | | 187/200 |
| 10,875,456 | B2* | 12/2020 | Beam, IV ............. | B66F 11/044 |
| 2010/0192487 | A1* | 8/2010 | Thornton .............. | E04F 11/064 |
| | | | | 52/183 |
| 2015/0047273 | A1* | 2/2015 | Whitten ................ | E04F 11/064 |
| | | | | 52/183 |
| 2020/0199881 | A1* | 6/2020 | Bianchi ................ | E04F 11/062 |

* cited by examiner

STAIR ASSEMBLY, AN OBJECT AND A STAIR ASSEMBLY OPERATING METHOD

BACKGROUND OF THE INVENTION

The invention relates to a moveable stair assembly, an object provided with such a stair assembly, and a method of operating the stair assembly.

Moveable stair assemblies are well-known, especially to get temporarily access to an attic only when necessary. As the stairs to an attic are usually not used all the time, the stair may be moveable to prevent interference with the stairs and keep sufficient space available for movement of persons and goods when the stair is not needed. Such stairs are thus only applied to the upper most floors of a building where access to the upper most floor is not required permanently. Although moveable stairs can also be applied to other floors of a building, this comes with the drawback that hiding the stair does not result in usable floor space on the upper floor and safety is not guaranteed on the upper floor. Especially with children, this provides a significant drawback.

A prior art moveable stair assembly not used for the upper most floors is disclosed in US patent publication U.S. Pat. No. 4,642,953. This publication discloses a moveable stair assembly allowing selectively access between two upper floors at the same level or between one of the upper floors and a lower floor by being moveable between a so-called catwalk position and a stairway position, respectively.

Although this disclosure provides safety at all times due to the presence of the handrails at all times, it does not provide usable floor space.

BRIEF SUMMARY OF THE INVENTION

In view of the above it is an object of the invention to provide a stair assembly that provides usable floor space in a hidden position and safety in an operational position.

According to a first aspect of the invention, there is provided a stair assembly to be arranged in a stairwell opening of an upper floor, comprising:
 a girder assembly;
 a plurality of steps mounted to the girder assembly; and
 a guard structure,
wherein the girder assembly is pivotably mountable to the upper floor to pivot about a pivot axis between an operational position, in which the girder assembly extends obliquely downwards between the upper floor and a lower floor to allow access from the upper floor to the lower floor, and a hidden position, in which the girder assembly extends horizontally in the stairwell opening parallel to the upper floor,
wherein the moveable guard structure is moveable between an operational position, in which the guard structure extends upwards from the upper floor to prevent a person from inadvertently falling into the stairwell opening, and a hidden position, in which the guard structure has moved downwards relative to the operational position,
and wherein the stair assembly is configured such that when the girder assembly and the guard structure are in their respective hidden positions a person is able to walk over the stair assembly as part of the upper floor. In other words, when the girder assembly and the guard structure are in their respective hidden positions the stair assembly is able to function as part of the upper floor.

An advantage of the stair assembly according to the first aspect of the invention is that both the girder assembly and the guard structure are moveable between a hidden configuration in which the stairwell opening becomes available as useful floor area, and an operational configuration, in which a fully functional stair is provided with guard structure guarding the stairwell opening.

In an embodiment, the guard structure is vertically translatable as a whole to move between the operational position and the hidden position. This may result in the guard structure extending into a space below the upper floor when being in the hidden position. This is not necessarily a disadvantage when the space is not accessible via other means and/or the space is not used when the stair assembly is in the hidden configuration.

In case the guard structure extending into a space below the upper floor is to be prevented or at least minimized suitable alternatives for or additions to the movability of the guard structures are:
 1. the guard structure—when in the hidden position—is at least partially foldable towards the upper floor;
 2. the guard structure is foldable to extend in the stairwell opening above the girder assembly in the hidden position.

In 1. the issue of the guard structure extending into the space below the upper floor is minimized while in 2. the issue is avoided.

Alternatively, or additionally, at least a portion of the guard structure can be wound on a roll, e.g. wires or cloth, which wires, or cloth, provide safety and prevent a person from passing the guard structure, but can easily be wound up to not extend into the space below the upper floor. Alternatively, or additionally, at least a portion of the guard structure is telescopic to minimize the extend of the guard structure into the space below the upper floor.

In an embodiment, the stair assembly comprises a cover to cover the girder assembly and/or the guard structure in their respective hidden positions in order to form a walking surface as part of the upper floor. Such a cover is especially advantageous when the guard structure is foldable to extend in the stairwell opening above the girder assembly in the hidden position and the guard structure is not able to form a smooth walking surface, e.g. when the guard structure comprises vertical posts.

In an embodiment, in the hidden position of the girder assembly the plurality of steps is arranged substantially horizontal with top surfaces of the plurality of steps forming a walking surface to be part of the upper floor. An advantage thereof is that a cover to form the walking surface can be omitted.

In an embodiment, in the hidden position of the girder assembly a distance between adjacent steps is smaller than 5 mm, preferably smaller than 3 mm, more preferably smaller than 2 mm, and most preferably smaller than 1 mm. Preferably, adjacent steps engage each other to form a substantially closed surface. An advantage of getting the steps close to each other is that the closer the steps are to each other, the more the look and feel of the walking surface is able to mimic the look and feel of the rest of the upper floor which also normally forms a closed surface. Further, small seams between the steps prevent small objects from inadvertently falling between the steps towards the lower floor. For a substantially closed floor this may even apply to dust and dirt.

In an embodiment, the stair assembly comprises a locking mechanism to lock the girder assembly in the hidden position and/or a locking mechanism to lock the girder assembly in the operational position. The locking mechanism for the hidden position and the locking mechanism for the operational position may be the same or at least share components. The locking mechanism may be manually and/or actively controllable, e.g. using a remote control, to release the lock. The locking mechanism(s) prevent(s) the stair from inadvertently moving from one configuration to another configuration, especially when being loaded by the weight of a person walking over the stair assembly.

In an embodiment, the locking mechanism comprises holes, recesses or engagement shoulders in the girder assembly cooperating with retractable pins, bars or other components provided in the stairwell opening. Alternatively, the locking mechanism comprises retractable pins, bars or other components on the girder assembly cooperating with holes, recesses or engagement shoulders in the stairwell opening.

In an embodiment, the guard structure comprises a guard rail e.g. supported by one or more vertical posts or panels. Preferably, in the hidden position, a top surface of the guard rail is flush with a top surface of the steps. The top surface of the guard rail may also form a walking surface in the hidden position to be part of the upper floor. The guard rail may be configured to cover other components, such as girders of the girder assembly, of the stair assembly in the hidden position.

In an embodiment, the guard structure and the girder assembly are interconnected such that movement of the girder assembly from the operational position to the hidden position automatically results in movement of the guard structure from the operational position to the hidden position and vice versa. Alternatively, or additionally, the interconnection may be such that movement of the guard structure from the operational position to the hidden position automatically results in movement of the girder assembly from the operational position to the hidden position and vice versa.

In an embodiment, the interconnection between the guard structure and the girder assembly is substantially balanced. This has the advantage that a relatively small force is required to move both the guard structure and the girder assembly in any direction, while an unbalanced interconnection only requires a relatively small force in one direction but requires a relatively large force in the other direction.

In an embodiment, an actuation system is provided to move the girder assembly between the operational position and the hidden position. The actuation system may be controlled by a control unit, which drives the actuation system based on user input, e.g. provided using a remote control, mobile device or wall switch.

In an embodiment, a further actuation system may be provided to move the guard structure between the operational position and the hidden position. The further actuation system may be controlled by a control unit, which drives the further actuation system based on user input, e.g. provided using a remote control, mobile device or wall switch.

The actuation system and/or the further actuation system may comprise one or more of the following:
  a hydraulic cylinder;
  compressor unit;
  electric drive;
  cables;
  pulleys;
  gears;
  other drive components.

In an embodiment, the actuation system and/or the further actuation system are a hold-to-run system which means that any user input needs to be provided during the entire time the girder assembly and/or the guard structure needs to move between the hidden position and the operational position. This results in more safe operation of the stair assembly because in the event of absence of the user input due to an emergency the movement of the actuation system and/or the further actuation system is immediately stopped.

In an embodiment, the actuation system and the locking system are coupled. For example, the actuation system may be a hydraulic actuation system having a pressure sensor for measuring the pressure in the hydraulic system, and moving the girder assembly from the operational position to the hidden position results in an increase of pressure in the hydraulic system upon reaching the hidden position, which increase in pressure being detected by the pressure sensor may result in a control unit switching a valve to drive the locking system accordingly to lock the girder assembly in the hidden position. The same is possible without using a pressure sensor when the increase in pressure itself is used to switch a valve.

According to a second aspect of the invention, there is provided an object comprising:
  an upper floor with a stairwell opening;
  a lower floor arranged below the upper floor; and
  a stair assembly arranged in the stairwell opening of the upper floor,
wherein the stair assembly comprises:
  a. a girder assembly;
  b. a plurality of steps mounted to the girder assembly; and
  c. a guard structure,
wherein the girder assembly at one end is pivotably mounted to the upper floor to pivot about a pivot axis between an operational position, in which the girder assembly extends obliquely downwards between the upper floor and the lower floor to allow access from the upper floor to the lower floor, and a hidden position, in which the girder assembly extends horizontally in the stairwell opening parallel to the upper floor,
wherein the moveable guard structure is moveable between an operational position, in which the guard structure extends upwards from the upper floor to prevent a person from inadvertently falling into the stairwell opening, and a hidden position, in which the guard structure has moved downwards relative to the operational position,
and wherein the stair assembly is configured such that when the girder assembly and the guard structure are in their respective hidden positions a person is able to walk over the stair assembly as part of the upper floor. In other words, when the girder assembly and the guard structure are in their respective hidden positions the stair assembly is able to function as part of the upper floor.

It is noted that the object according to the second aspect of the invention can be any object including but not limited to:
  a building;
  a vessel;
  an aircraft;
  bunker;
  any other construction or man-build object.

It is further noted that the upper floor can be any floor, including a substantially flat roof of the object, e.g. a helicopter platform on a building or vessel. The same applies to the lower floor, which can be any floor including a basement floor. The terms 'upper' and 'lower' are only used to define the mutual relationship between the upper floor and the lower floor, namely that the upper floor is at a height level above the height level of the lower floor.

In an embodiment, the upper floor comprises flooring material, wherein in the hidden position a top surface of the steps is flush with a top surface of the flooring material.

In an embodiment, the upper floor comprises flooring material, wherein in the hidden position a top surface of the guard structure is flush with a top surface of the flooring material.

In an embodiment, the stair assembly comprises a cover to cover the girder assembly and/or the guard structure in their respective hidden positions in order to form a walking surface as part of the upper floor, wherein the walking surface is flush with the top surface of the flooring material of the upper floor.

In an embodiment, the steps comprise the same material as the flooring material.

In an embodiment, the guard structure comprises a guard rail, wherein preferably the guard rail comprises the same material as the flooring material.

It will be apparent to the skilled person that features and embodiments related to the first aspect of the invention can also be applied in a similar manner to the invention according to the second aspect so that these features and embodiments will not be unduly repeated here.

According to a third aspect of the invention, there is provided a method for operating the stair assembly according to the first aspect of the invention or the stair assembly of the second aspect of the invention, wherein the girder assembly and the guard structure are interconnected such that movement of one results in movement of the other, said interconnection being substantially balanced, and said method comprising the following steps:
 a) providing the girder assembly and the guard structure in their respective hidden positions; and
 b) standing on one of the steps thereby applying sufficient weight to the girder assembly to move the girder assembly to the operational position and automatically move the guard structure to the operational position.

In an embodiment, prior to step b) a locking mechanism is operated to release the girder assembly.

In an embodiment, the position of the girder assembly or the guard structure is locked when reaching the operational position, e.g. by a locking mechanism.

In an embodiment, the stair assembly is configured such that a person of 80 kg standing on the step closest to the pivot axis of the girder assembly causes the girder assembly to move from the hidden position to the operational position in at least 5 seconds, preferably at least 10 seconds, more preferably at least 20 seconds, and most preferably at least 30 seconds. This may also apply to the situation after some friction is overcome in the hidden position.

In an embodiment, a self-braking mechanism, e.g. in the form of a damping device is provided to reduce the speed of the moving girder assembly when reaching the operational position. An advantage thereof may be that any contact between girder assembly and lower floor is smooth.

According a fourth aspect of the invention, there is provided a method for operating the stair assembly according to the first aspect of the invention or the stair assembly of the second aspect of the invention, wherein the girder assembly and the guard structure are interconnected such that movement of one results in movement of the other, said interconnection being substantially balanced, and said method comprising the following steps:
 a) providing the girder assembly and the guard structure in their respective operational position; and
 b) pushing the guard structure downwards to the hidden position thereby automatically moving the girder assembly to the hidden position.

In an embodiment, prior to step b) a locking mechanism is operated to release the girder assembly.

In an embodiment, the position of the girder assembly is locked when reaching the hidden position, e.g. by a locking mechanism.

In an embodiment, the stair assembly is configured such that a person pushing the guard structure downwards with a force equal to 40 kg causes the girder assembly to move from the operational position to the hidden position in at least 5 seconds, preferably at least 10 seconds.

It will be apparent to the skilled person that features and embodiments relating to the first and second aspect of the invention can readily be combined with the third and fourth aspect of the invention, where applicable, and these features and embodiments will not be described here again to avoid unduly repetition.

BRIEF DESCRIPTION OF THE DRAWINGS

The invention will now be described in a non-limiting way by reference to the accompanying drawings in which like parts are indicated by like reference symbols and in which.

DETAILED DESCRIPTION OF THE INVENTION

Figure 1:
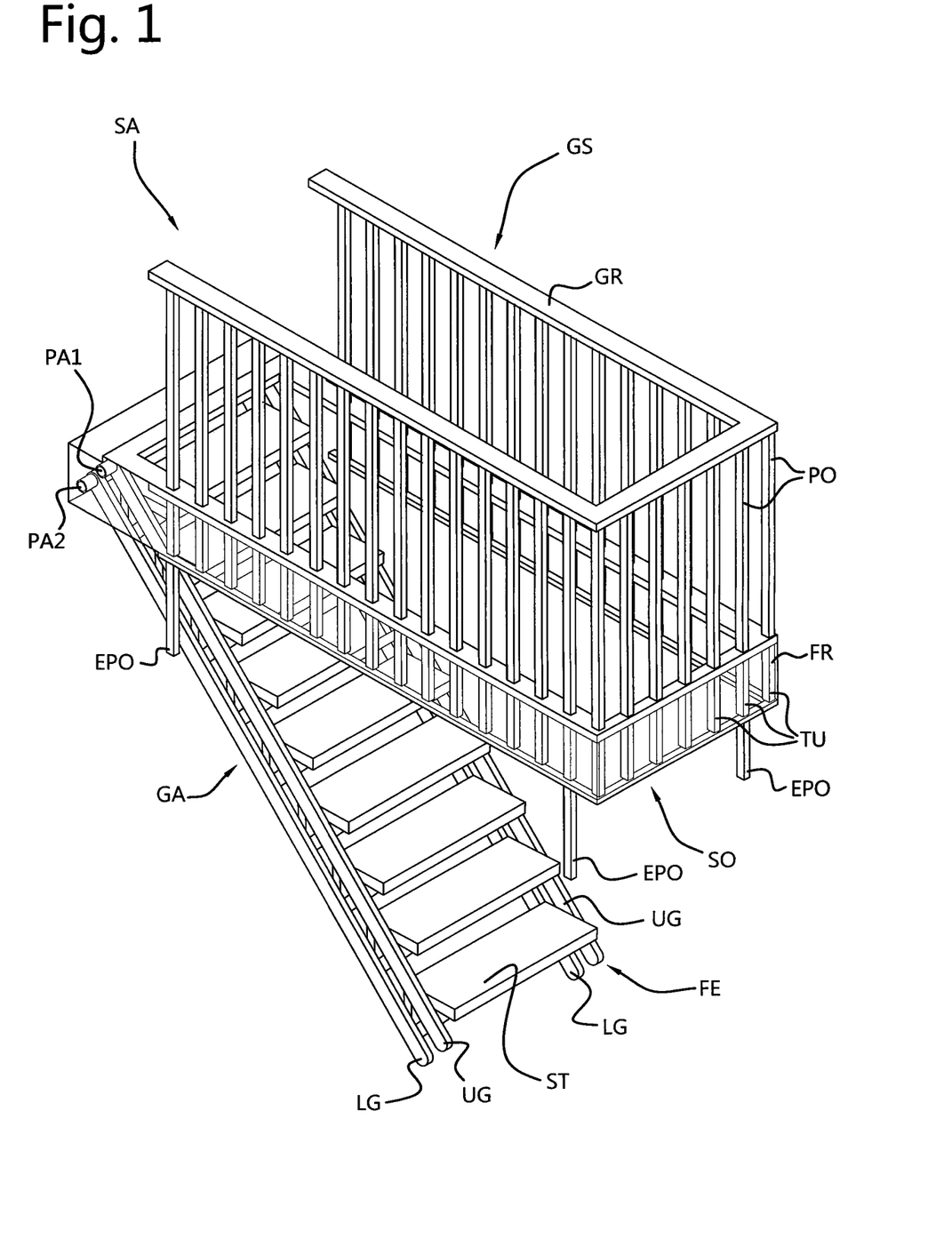
FIG. 1 schematically depicts a perspective view of a stair assembly according to an embodiment of the invention.
Figure 2:
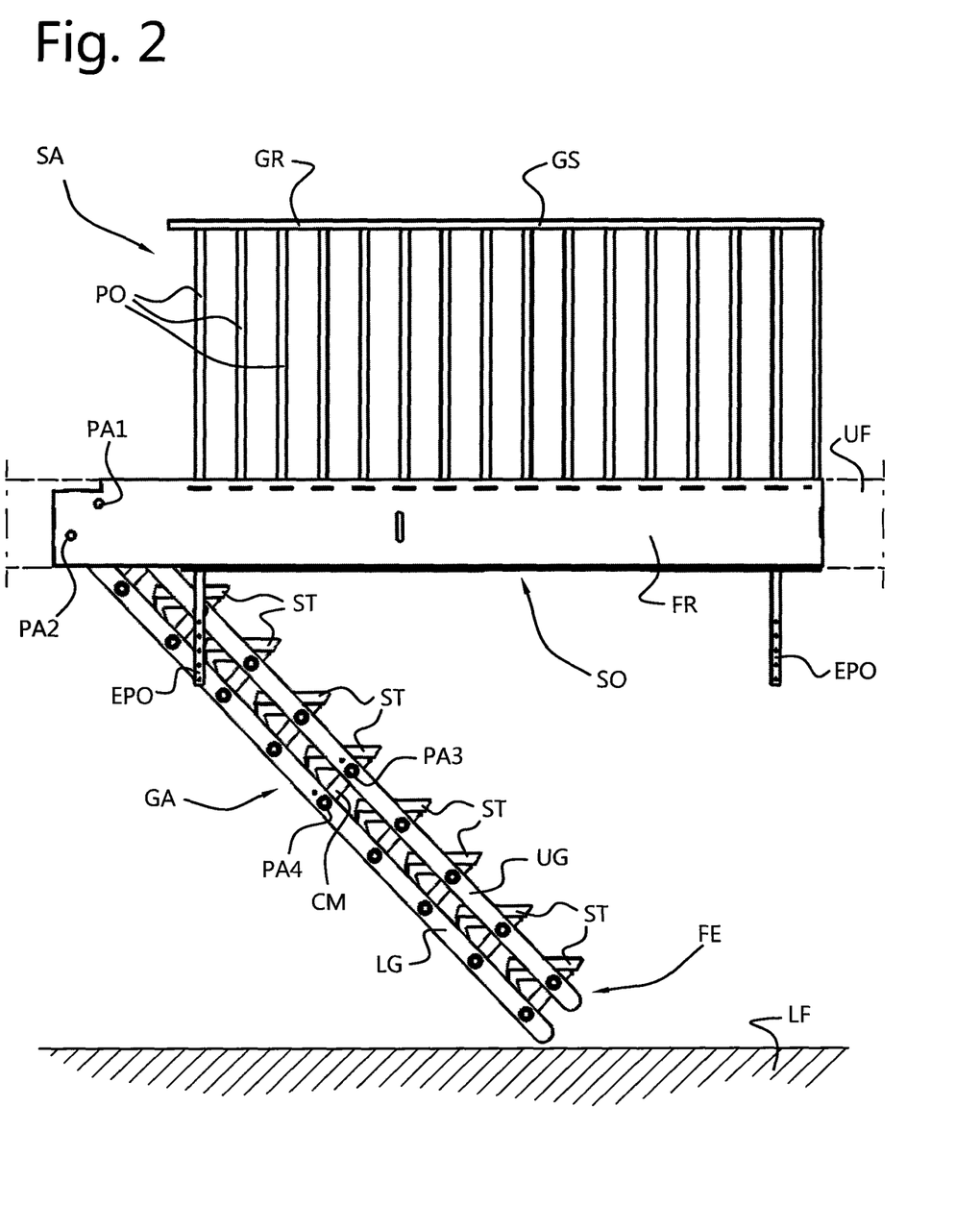
FIG. 2 schematically depicts a side view of the stair assembly of FIG. 1.
Figure 3:
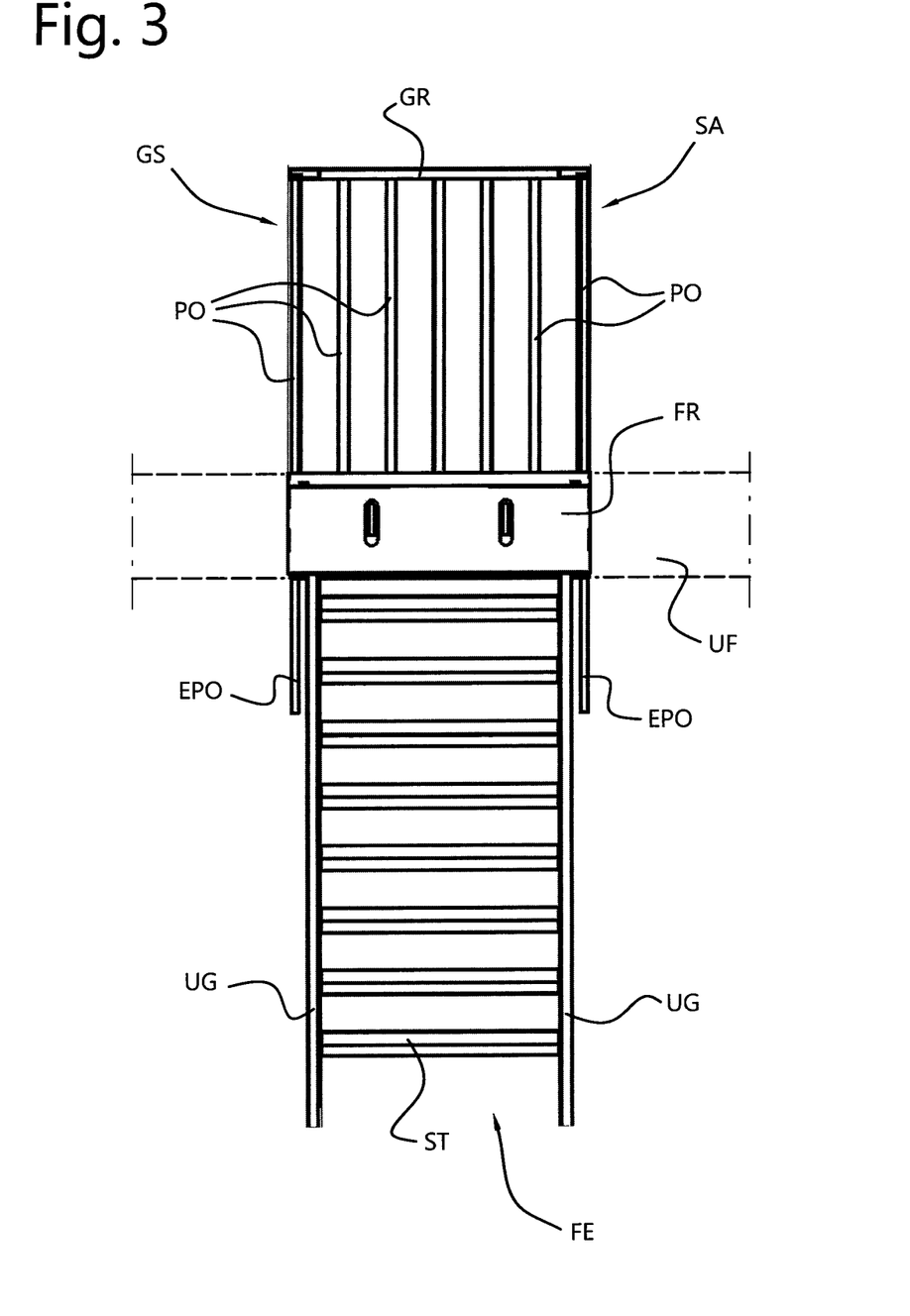
FIG. 3 schematically depicts a front view of the stair assembly of FIG. 1.

FIGS. 1-6 depict a stair assembly SA according to an embodiment of the invention suitable to be arranged in a stairwell opening SO of an upper floor UF. In FIGS. 1-3 the stair assembly SA is shown in an operational configuration allowing access from the upper floor UF to a lower floor LF. The terms "upper" and "lower" are used to describe the mutual relationship between the two floors UF and LF and do not in any way limit the scope of the invention to particular floors. However, in an embodiment, the lower floor is a basement floor, e.g. the lowest floor in a building, and the upper floor may be the floor directly above the lower floor, e.g. a ground floor. In an embodiment, there are one or more intermediate floors present between the lower floor and the upper floor, so that the upper floor is not necessarily directly above the lower floor.

Figure 4:
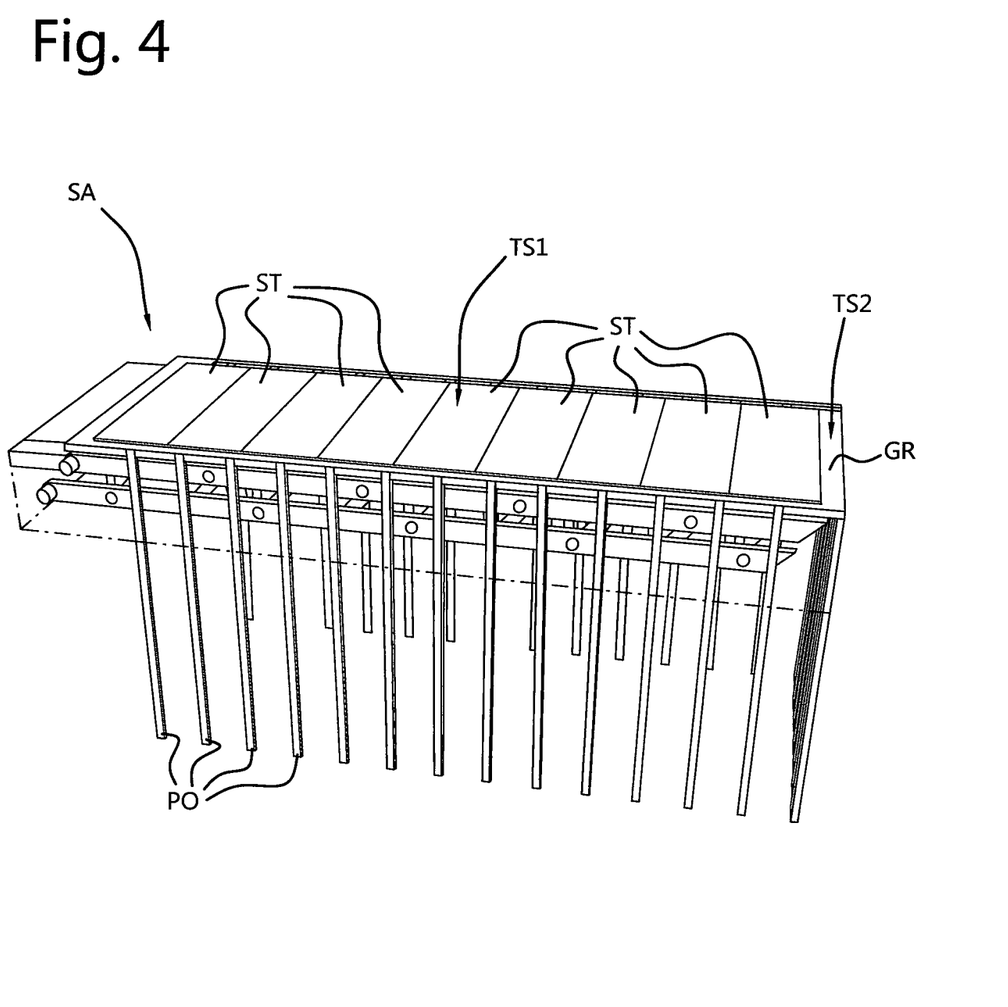
FIG. 4 schematically depicts the stair assembly of FIGS. 1-3 in a hidden configuration.
Figure 5:
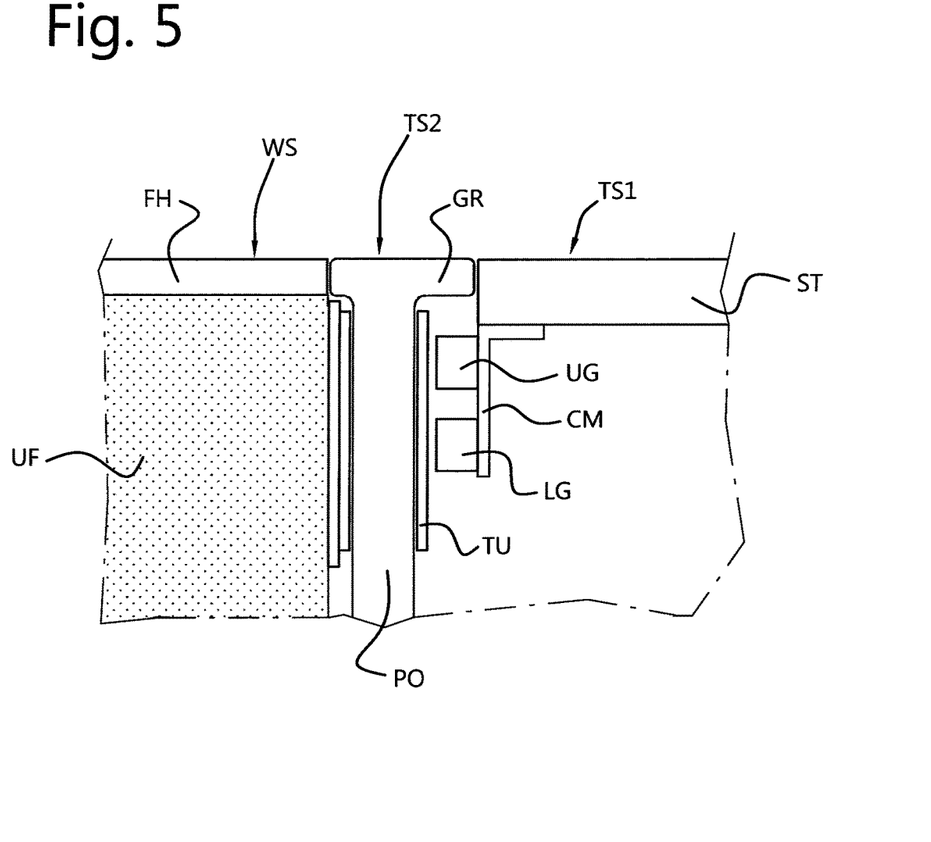
FIG. 5 schematically depicts a detailed cross section of the stair assembly of FIG. 4.
Figure 6:
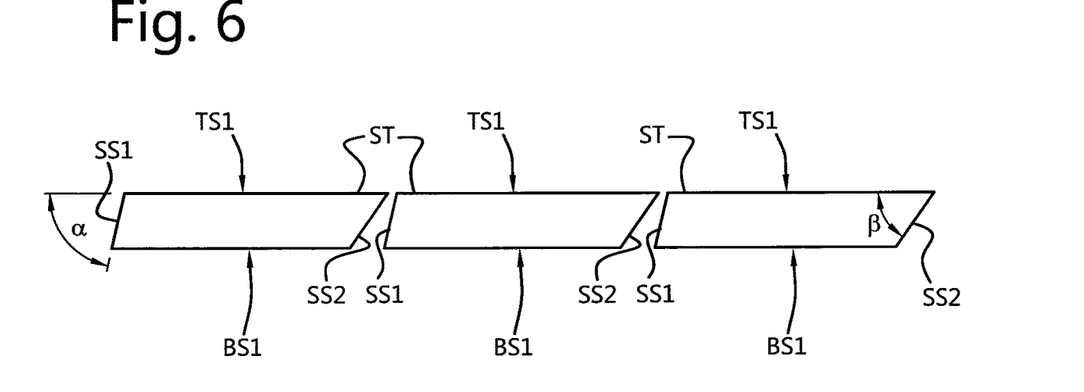
FIG. 6 schematically depicts a side view of some of the plurality of steps of the stair assembly of FIG. 4.

The upper floor UF and the lower floor LF may be part of a building that is not depicted and described in more detail as it is not relevant for the invention. It can be any type of building, e.g. being a house or office. Alternatively, the upper floor UF and the lower floor LF can be part of any other object, such as a vessel, an aircraft, a bunker or any other kind of construction or man-build object. In other applications, the term "deck" may be used to refer to a floor, so that upper floor UF may alternatively be referred to as upper deck and lower floor LF may alternatively be referred to as lower deck. Further, the upper floor UF may also be a roof of an object, e.g. a helicopter platform or helicopter deck. FIGS. 4-6 relate to a hidden configuration of the stair assembly SA in which the stairwell opening SO is at least partially, but preferably fully closed by the stair assembly and a person is able to walk over the stair assembly SA as if the stair assembly is part of the upper floor UF.

As a result thereof, the stair assembly SA according to the invention can be used at locations to save floor space at the upper floor in the hidden configuration while at the same time provide the possibility to access the lower floor by transforming the stair assembly from the hidden configuration to the operational configuration. This allows to make a stairwell opening SO at locations which normally would not be considered for the location of a stair and/or allows to design the surroundings of the stairwell opening taking the extra floor space in the hidden configuration into account.

The stair assembly SA in this embodiment comprises a frame FR arranged at inner sides of the stairwell opening SO. In this embodiment, the frame FR extends along the entire stairwell opening SO, but it is also envisaged that the frame FR for instance only extends along the longitudinal sides of the stairwell opening SO, or that the frame FR engages with only three sides of the stairwell opening SO.

It is explicitly mentioned here that a frame is not necessary per se. It is also possible that individual components of the stair assembly are mounted directly to the upper floor, where applicable. A combination where a part of the assembly is mounted directly to the upper floor and another part of the assembly is mounted to the upper floor via a frame is also envisaged.

The stair assembly SA comprises a girder assembly GA, a plurality of steps ST mounted to the girder assembly GA, and a guard structure GS.

The girder assembly GA comprises two girder sets, each girder set comprising an upper girder UG and a lower girder LG, which upper girder and lower girder are pivotably mounted to the frame FR and thereby to the upper floor UF to pivot about a first pivot axis PA1 and a second pivot axis PA2, respectively.

A step ST is connected to each girder set using a connecting member CM, which connecting member CM is pivotably mounted to the upper girder UG to pivot about a respective third pivot axis PA3, and which connecting member CM is pivotably mounted to the lower girder LG to pivot about a respective fourth pivot axis PA4. It is noted that only in FIG. 2 one of the connecting members CM with corresponding third and fourth pivot axis PA3, PA4 have been provided with reference symbols to keep the drawing eligible. The skilled person will understand that the same applies to the other steps.

As is preferred for this embodiment, for each step ST a distance between the first and second pivot axis is equal to a distance between the third and fourth pivot axis while at the same time a distance between the first and third pivot axis is equal to a distance between the second and fourth distance, so that for each step ST the upper floor UF or frame FR, upper girder UG, lower girder LG and the connecting member CM form a parallelogram. As a result thereof, the orientation of the corresponding step, which is preferably horizontal, is maintained during all angular positions of the girder assembly GA.

As mentioned before, the pivotability of the girder assembly allows to move the girder assembly between an operational position as shown in FIGS. 1-3, in which the girder assembly GA extends obliquely downwards between the upper floor UF and the lower floor LF to allow access from the upper floor to the lower floor, and a hidden position as shown in FIGS. 4-6, in which the girder assembly GA extends substantially horizontally in the stairwell opening parallel to the upper floor UF.

A free end FE of the girder assembly GA is preferably provided with a releasable locking mechanism (not shown) able to cooperate with the frame FR or any other element provided there for locking purposes in order to lock the girder assembly GA in the hidden position. Hence, when the stair assembly SA is in the hidden configuration, the locking mechanism prevents the girder assembly GA from inadvertently moving to the operational position, even when a person is standing on or walking over the steps ST as part of the upper floor UF. When the person wants to get access to the lower floor LF, the locking mechanism needs to be operated first to release the girder assembly. Operating the locking mechanism may be carried out by hand, using a remote control or automatically using a control unit controlling the locking mechanism based on user input or input from an autonomously operating program or software, which may for instance be run in dependency of a sensor input and/or a timer.

The locking mechanism may comprise hydraulically operated pins arranged on the frame FR or on the free end FE of the girder assembly GA cooperating with corresponding holes, recesses or engagement shoulders on the other one of the frame FR or the free end FE of the girder assembly GA.=

The locking mechanism described above or a provided further locking mechanism may be configured to lock the girder assembly GA in the operational position. Hence, when the stair assembly SA is in the operational configuration, the locking mechanism prevents the girder assembly GA from inadvertently moving to the hidden position.

The guard structure GS comprises a plurality of vertically extending posts PO supporting a guard rail GR. For clarity reasons, only a few posts have been denoted with reference symbol PO. The frame FR is in this embodiment provided with vertically extending tubes TU to moveably receive a respective vertical post PO. The vertically extending posts PO are able to move in their respective tubes TU between a raised position, alternatively referred to as an operational position, as shown in FIGS. 1-3, in which the guard structure GS extends upwards from the upper floor UF to prevent a person from inadvertently falling into the stairwell opening SO, and a lowered position, alternatively referred to as a hidden position, as shown in FIGS. 4-6, in which the guard structure has moved downwards relative to the raised (operational) position.

The vertically extending tubes TU guide the movement of the posts PO. Hence, in a more general description, the guard rail is supported by a supporting structure, which in turn is moveably guided by respective guiding members. The supporting structure is in this embodiment formed by the plurality of vertically extending posts, but may alternatively be formed by panels, e.g. wooden or glass panels with or without any space in between the panels. The guiding members may be tubes or tubulars to receive the posts or panels or slot members to receive the panels in the slots. Other guiding members, possibly cooperating with guiding elements on the supporting structure may also be envisaged.

The guard structure is preferably provided at all sides of the stairwell opening SO except for an entrance side at the side of the first and second pivot axis PA1, PA2 where a person will access the steps to descend to the lower floor LF. However, it is also possible that due to other constructional provisions such as walls, furniture or other structures, the guard structure may only be provided at least partially at one or more sides where a danger of inadvertently falling into the stairwell opening is present. Further, the guard structure may also be partially provided at the entrance side to limit access to the steps and/or may be provided with a child safety provision at the entrance side to prevent a child from entering the steps when the stair assembly is in the operational configuration.

In an embodiment, as shown clearly in FIG. 5, the upper floor UF may be provided with flooring material FM such as carpet, laminate flooring, tiled floor or any other flooring providing a walking surface WS. Preferably, in the hidden configuration, a top surface TS1 of the steps ST and a top surface TS2 of the guard rail GR are flush with the walking surface of the flooring material FM in their respective hidden positions. As shown in FIG. 5, the guard rail GR can be used to cover other components of the stair assembly, such as the frame FR, tubes TU, and girder set, not covered by the steps ST. Preferably, seams between steps ST and/or seams between step ST and guard rail GR and/or seams between guard rail GR and the flooring material FM are below 5 mm, preferably below 3 mm, more preferably below 2 mm and most preferably below 1 mm, in the hidden positions seen in plan view.

In this embodiment, some vertically extending posts of the guard structure are longer than other posts PO. These posts are referred to as extended vertical posts EPO and may be connected to the girder assembly using cables (not shown) such that when the girder assembly GA moves from the hidden position to the operational position, the girder assembly via the cables is automatically pulled upwards from the hidden position to the operational position.

In an embodiment, the weight of the guard structure is substantially balanced by the combination of girder assembly and steps that without external actuation or loading there is no movement of the girder assembly. It is then possible that, optionally after releasing a locking mechanism, simply standing on the first step ST of the stair assembly is required to apply sufficient load to the stair assembly to lower the girder assembly and raise the guard structure. Moving the stair assembly from the operational configuration to the hidden position can then be easily done by going to the upper floor UF and push the guard structure downwards. Alternatively, or additionally, an actuation system may be provided allowing to actively move the stair assembly between the two configurations. The actuation system may therefore comprise one or more actuators and a control unit to control the one or more actuators based on user input. The locking mechanism may also be actively controlled, e.g. using the same control unit.

FIG. 6 depicts a side view of some of the plurality of steps ST of the stair assembly. In this view the steps ST are in the hidden configuration and thus aligned with each other in a horizontal direction. In FIG. 6 it is assumed that the pivot axes PA1, PA2 of the corresponding girders is at the left side of the drawing similar to the situation in FIG. 2. Hence, each step ST has a top surface TS1, a bottom surface BS1, a first side surface SS1 and a second side surface SS2 with the first side surface SS1 being arranged at the pivot axis side of the step ST and the second side surface being arranged at the opposite side of the step ST, i.e. the first side surface SS1 faces towards the pivot axis and the second side surface SS2 faces away from the pivot axis.

In this embodiment of the invention, the first side surface SS1 makes an angle α with a plane parallel to the top surface TS1 and the second side surface SS2 makes an angle β with the top surface TS1 such that β<α. As a result thereof, each step ST is able to move below the adjacent step ST that is closer to the pivot axis when moving from the hidden position to the operational position without interfering with each other. It will be apparent to the skilled person that side surface SS2 of the step at the largest distance from the pivot axis and the side surface SS1 of the step closest to the pivot axis may be arranged differently as they have no adjacent step.

In an example, α is larger than 45 degrees, preferably larger than 60 degrees, more preferably larger than 75 degrees and probably larger than 90 degrees. α may for instance be 76 degrees. β may be in the range of 45-75 degrees, preferably 60 degrees. An advantage of a being smaller than 90 degrees is that when the steps ST are in the hidden configuration, a person looking through the seam between two steps looks at surface SS1 instead of the space below the steps ST making the seam less striking.

Although the invention is described having a girder assembly GA including two girder sets with each set comprising an upper girder and lower girder, more simple embodiments also fall within the scope of the invention. It is for instance possible that a single girder is used to which the plurality of steps is mounted. The single girder may for instance be provided in the middle of the steps. It is also possible that two girders are used, a girder being arranged on each side of the plurality of steps such as a girder set is arranged on each side as previously described. Alternatively, a single girder set may be provided, e.g. in the middle of the steps.

In the above described embodiment with the girder sets, the provision of the two parallel girders in each girder set provide a passive way of keeping the orientation of the steps horizontal in all angular orientations of the girder. The same advantage may be provided when a single girder set is used, but in the other examples using a single girder or two girders on each side, this may not be provided necessarily. It is therefore an option to provide steps that are moveable relative to the girders and need to operated, e.g. by hand, e.g. using a separate mechanism or actively, e.g. using an actuator to position the steps in the correct orientation. The steps may also be rigidly mounted to the girder assembly in such a manner that the correct orientation of the steps is only achieved in the operational position of the girder assembly.

Although in the above described embodiment, the length of the girder assembly is smaller than a length of the stairwell opening, it is envisaged that the girder assembly comprises an extension which in the operational position of the girder assembly is in line with the girder assembly and extends between the free end FE of the girder assembly and the ground in case the girder assembly is not able to cross the entire height between the upper floor and the lower floor, and which in the hidden position extends downwards from the girder assembly. The extension may also be provided on the lower floor as a permanent or (semi)-temporarily provision allowing to receive or meet the girder assembly in the operational position.

Although in the above described embodiment, a length of the girder assembly more or less matches a length of the stairwell opening, it is possible that a portion of the stairwell opening is permanently closed by a cover and the girder assembly in the hidden position extends below the cover. The steps that are in the hidden position below the cover may be adapted such that they do not interfere with the cover while the other steps may be flush with the cover to form a waling surface.

The invention claimed is:

1. A method for operating a stair assembly to be arranged in a stairwell opening of an upper floor, comprising:
   a girder assembly,
   a plurality of steps mounted to the girder assembly, and
   a guard structure, wherein the girder assembly is pivotably mountable to the upper floor to pivot about a pivot axis between an operational position, in which the girder assembly extends obliquely downwards between the upper floor and a lower floor to allow access from the upper floor to the lower floor, and a hidden position, in which the girder assembly extends horizontally in the stairwell opening parallel to the upper floor, wherein the guard structure is moveable between an operational position, in which the guard structure extends upwards from the upper floor to prevent a person from inadvertently falling into the stairwell opening, and a hidden position, in which the guard structure has moved downwards relative to the operational position, wherein the stair assembly is configured such that when the girder assembly and the guard structure are in their respective hidden positions a person is able to walk over the stair assembly as part of the upper floor, wherein with the girder assembly and the guard structure are interconnected such that movement of one results in movement of the other, said interconnection being substantially balanced, and said method comprising the following steps:

a) providing the girder assembly and the guard structure in their respective hidden positions; and b) standing on one of the steps thereby applying sufficient weight to the girder assembly to move the girder assembly to the operational position and automatically move the guard structure to the operational position.

2. A method according to claim 1, wherein prior to step b) a locking mechanism is operated to release the girder assembly.

3. A method for operating a stair assembly to be arranged in a stairwell opening of an upper floor, comprising:
a girder assembly,
a plurality of steps mounted to the girder assembly, and
a guard structure,
wherein the girder assembly is pivotably mountable to the upper floor to pivot about a pivot axis between an operational position, in which the girder assembly extends obliquely downwards between the upper floor and a lower floor to allow access from the upper floor to the lower floor, and a hidden position, in which the girder assembly extends horizontally in the stairwell opening parallel to the upper floor, wherein the guard structure is moveable between an operational position, in which the guard structure extends upwards from the upper floor to prevent a person from inadvertently falling into the stairwell opening, and a hidden position, in which the guard structure has moved downwards relative to the operational position, wherein the stair assembly is configured such that when the girder assembly and the guard structure are in their respective hidden positions a person is able to walk over the stair assembly as part of the upper floor, wherein with the girder assembly and the guard structure are interconnected such that movement of one results in movement of the other, said interconnection being substantially balanced, and said method comprising the following steps:

a) providing the girder assembly and the guard structure in their respective operational position; and b) pushing the guard structure downwards to the hidden position thereby automatically moving the girder assembly to the hidden position.

4. A method according to claim 3, wherein the girder assembly is locked when reaching the hidden position by a locking mechanism.

5. A stair assembly to be arranged in a stairwell opening of an upper floor, comprising:
a girder assembly;
a plurality of steps mounted to the girder assembly,
a guard structure;
wherein the girder assembly is pivotably mountable to the upper floor to pivot about a pivot axis between an operational position, in which the girder assembly extends obliquely downwards between the upper floor and a lower floor to allow access from the upper floor to the lower floor, and a hidden position, in which the girder assembly extends horizontally in the stairwell opening parallel to the upper floor, wherein the guard structure is moveable between an operational position, in which the guard structure extends upwards from the upper floor to prevent a person from inadvertently falling into the stairwell opening, and a hidden position, in which the guard structure has moved downwards relative to the operational position, and wherein the stair assembly is configured such that when the girder assembly and the guard structure are in their respective hidden positions a person is able to walk over the stair assembly as part of the upper floor.

6. A stair assembly according to claim 5, wherein the girder assembly comprises two girder sets, each of the girder sets comprising an upper girder and a lower girder, each of the upper girders and each of the lower girders are pivotably mounted to a frame to pivot about a first pivot axis and a second pivot axis, respectively, wherein each of the steps is connected to each of the girder sets using a respective connecting member, each of the respective connecting members is pivotably mounted to the respective upper girder to pivot about a third pivot axis, and each of the respective connecting members is pivotably mounted to the respective lower girder to pivot about a fourth pivot axis, wherein for each of the steps a distance between the first pivot axis and the second pivot axis is equal to a distance between the third pivot axis and the fourth pivot axis while at the same time a distance between the first pivot axis and the third pivot axis is equal to a distance between the second pivot axis and the fourth pivot axis, wherein in the hidden position of the girder assembly the girder assembly extends substantially horizontally in the stairwell opening and the plurality of steps are arranged substantially horizontal with top surfaces of the plurality of steps forming a walking surface.

7. A stair assembly according to claim 6, wherein in the hidden position of the girder assembly a distance between adjacent steps of the plurality of steps is smaller than 1 mm.

8. A stair assembly according to claim 5, further comprising a releasable locking mechanism to lock the girder assembly in the hidden position.

9. An object comprising:
an upper floor with a stairwell opening;
a lower floor arranged below the upper floor; and
a stair assembly arranged in the stairwell opening of the upper floor,
wherein the stair assembly comprises:
a. a girder assembly;
b. a plurality of steps mounted to the girder assembly; and
c. a guard structure,
wherein the girder assembly at one end is pivotably mounted to the upper floor to pivot about a pivot axis between an operational position, in which the girder assembly extends obliquely downwards between the upper floor and the lower floor to allow access from the upper floor to the lower floor, and a hidden position, in which the girder assembly extends horizontally in the stairwell opening parallel to the upper floor, wherein the guard structure is moveable between an operational position, in which the guard structure extends upwards from the upper floor to prevent a person from inadvertently falling into the stairwell opening, and a hidden position, in which the guard structure has moved downwards relative to the operational position, and wherein the stair assembly is configured such that when the girder assembly and the guard structure are in their respective hidden positions a person is able to walk over the stair assembly as part of the upper floor.

10. An object according to claim 9, wherein the object is a building, a vessel, an aircraft or a bunker.

* * * * *